United States Patent
Worthington (10) Patent No.: US 9,922,267 B1
(45) Date of Patent: Mar. 20, 2018

(54) LOCATING FEATURES IN WARPED IMAGES

(71) Applicant: Adobe Systems Incorporated, San Jose, CA (US)

(72) Inventor: John Worthington, Minnetonka, MN (US)

(73) Assignee: Adobe Systems Incorporated, San Jose, CA (US)

( * ) Notice: Subject to any disclaimer, the term of this patent is extended or adjusted under 35 U.S.C. 154(b) by 12 days.

(21) Appl. No.: 15/255,022

(22) Filed: Sep. 1, 2016

(51) Int. Cl.
*G06K 9/46* (2006.01)
*G06T 3/00* (2006.01)
*G06T 7/00* (2017.01)

(52) U.S. Cl.
CPC .......... *G06K 9/4671* (2013.01); *G06T 3/0093* (2013.01); *G06T 7/004* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 5,611,000 A * | 3/1997 | Szeliski | ............... | G06K 9/6203 382/294 |
| 5,633,951 A * | 5/1997 | Moshfeghi | ........... | G06K 9/6207 375/E7.084 |
| 7,312,805 B1 | 12/2007 | Worthington | | |
| 7,400,330 B2 * | 7/2008 | Lefebvre | ............... | G06T 11/001 345/552 |
| 2006/0193535 A1 * | 8/2006 | Mishima | .............. | G06K 9/6206 382/294 |

OTHER PUBLICATIONS

Jacek Nieweglowski et al, "A novel Video Coding Scheme Based on Temporal Prediction Using Digital Image Warping", IEEE 1993.*

* cited by examiner

*Primary Examiner* — Mark Roz
(74) *Attorney, Agent, or Firm* — Kilpatrick Townsend & Stockton LLP (57) ABSTRACT

Techniques for locating features of interest in warped images are described. For example, a destination image is generated from a source image based on warping a portion of the source image according to a backward map. Each of the two images is associated with a mesh having a tile-based geometry. The backward map maps points from the destination mesh to pixels in the source image. Triangles are formed from the tiles of the destination mesh. A forward map is generated based on the triangles and the backward map. The forward map maps points from the source mesh to pixels in the destination image. A point from the source mesh is identified that corresponds to a pixel of a feature of interest. The forward map is applied to this point to locate a pixel in the destination image. This pixel corresponds to the location of the feature in the destination image.

20 Claims, 9 Drawing Sheets

LOCATING FEATURES IN WARPED IMAGES

TECHNICAL FIELD

This disclosure generally relates to efficiently and accurately locating features of interest in warped images.

BACKGROUND

Image rendering applications, such as Adobe Photoshop® (available from Adobe Systems Incorporated, San Jose, Calif.), are widely popular and enable different image-related operations. Examples of such operations include image warping and feature recognition.

Image warping is a method of modifying an image by changing the spatial configuration of portions of the image. A source image can be warped into a destination image according to a specified mapping between the source image and the destination image. For instance, an object in the source image can be resized and moved to a new location in the destination image.

In comparison, feature recognition is a method of recognizing a feature rendered in an image from properties of the image pixels. For instance, facial recognition software can identify facial features (mouth, nose, eyes, etc.) of a person.

Generally, an image rendering application can provide both image warping and feature recognition operations. To do so, a feature is first recognized and marked in the source image. Subsequently, the image rendering application finds the new location of the feature in the destination image based on the mapping between the two images. The new location is marked as that of the feature.

Various technical challenges, including computational efficiency and accuracy, arise when the image rendering application is configured to provide both operations. As a solution, existing systems generally trade-off between computational efficiency and accuracy.

For example, an existing system configures an image rendering application to use a one-to-one pixel mapping between source and destination images. This mapping tracks each pixel in the two images, thereby achieving high accuracy with respect to locating a feature in the destination image. However, because each pixel is tracked, the computational burden (e.g., processor and memory usage) is relatively high. The high computational burden can translate into user interface (UI) lag, thereby degrading the user experience.

In another example, an existing system configures an image rendering application to use meshes. A mesh is generally sparse and has a lower resolution than an image. An example of the mesh is a subset of pixels from the image (e.g., every fourth pixel in the image). Rather than mapping source and destination images, the image rendering application uses source and destination meshes that correspond to the two images. Generally, the lower the resolution, the higher computational savings are (e.g., for a 25% resolution—every fourth pixel—the computational savings can be up to 93.75%).

However, source and destination meshes provide inaccurate results when used for locating, in the destination image, a feature from the source image. One reason for this inaccuracy involves displacement offsets. Specifically, the image warping can displace a feature, where the displacement is at an offset relative to resolution of the destination mesh. For instance, the resolution of a mesh as compared to an image is every fourth pixel, but an eye (or some other facial feature) may be displaced by three pixels in an image warping operation. If the mapping between the meshes does not properly track the offset (e.g., one pixel in the illustrative eye example), the image rendering application incorrectly tracks the feature's location in the destination image. Practically, rather than locating the eye in the destination image, the image rendering application incorrectly identifies an eyebrow, thereby also degrading the user experience.

Another reason for the feature-location inaccuracy are holes in the mapping. Specifically, a warping operation can compress the source image. In certain situations, the compression results in points on the source mesh not having neighboring vectors for mapping these points to points in the destination image. When averaging is applied for the mapping, the absence of neighboring vectors causes the averaging techniques to fail, which results in the holes. Hence, if a feature falls in a hole, that feature can no longer be located in the destination image. Practically, if the eye is recognized in the source image but is unmapped, the image rendering application no longer identifies the eye in the destination image because of the holes in the mapping. This also degrades the user experience.

SUMMARY

One exemplary embodiment involves improving the computational efficiency and the accuracy of locating features of interest in warped images. In particular, a mapping between a source image and a destination image is used, where the mapping relies on meshes. Each of a source mesh, which corresponds to the source image, and a destination mesh, which corresponds to the destination image, has a lower pixel resolution than the source image.

In an example, the mapping between a source image and a destination image includes a backward map and a forward map. The backward map is usable to apply an image warping operation to the source image. For example, the backward map defines, for each point on the destination mesh, a vector that points to a pixel in the source image. The destination image is generated based on the collection of vectors for destination mesh points and their associated pixels from the source image. The forward map is usable to track how a location of a feature of interest changes from the source image to the destination image. For example, the forward map defines, for each point on the mesh of the source image, a vector that points to a pixel in the destination image.

In an example, the backward and forward maps are generated by using specific mesh geometries that avoid holes. For instance, a tile-based geometry is used to derive the backward map, where a mesh is a collection of contiguous tiles (e.g., geometric units having four points). In comparison, a triangle-based geometry is used to derive the forward map, where a mesh is a collection of contiguous triangles (e.g., geometric units having three points). Using two different geometries increases the robustness of the analysis and avoids holes in the mapping, thereby improving the accuracy.

In an example, an image rendering application renders the source image. Features of interest in the source image are identified and marked. The image rendering application warps the source image to generate the destination image, where the image warping relies on the backward map. To track how a location of a marked feature of interest has changed, the image rendering application applies the forward map, identifies the new location of the feature in the destination image, and marks the new location.

As described herein, a system hosts an image rendering application that enables image warping and feature recognition as two image-rendering operations. When the system configures the image rendering application to use the backward and forward maps of the present disclosure, the operations of such systems are improved. In particular, the computational burden is reduced and the accuracy is enhanced, where computational burden and accuracy are associated with hosting the two image-rendering operations.

For example, relative to existing systems that use one-to-one mapping, computational efficiency (e.g., about 93.75% for a 25% pixel resolution) is increased, while also achieving the same high accuracy. Relative to existing mesh-based systems, similar computational efficiency is achieved, while significantly improving the accuracy and, even, locating a feature that existing mesh-based systems would have otherwise failed to locate. Specifically, because no holes exist, any feature of interest can be properly located in the destination image. In comparison, existing mesh-based system would fail to locate a feature of interest when it falls in a hole.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Generally, the embodiments described herein involve efficiently and accurately locating features of interest in warped images. More specifically, substantial computational efficiency is gained by relying on meshes of source and destination images. Relative to existing systems that implement one-to-one pixel mapping, increased computational efficiency (e.g., reduced processor loads, memory usage, or both) can be achieved. By relying on specific mesh-based geometries to derive the mapping between the two images, the accuracy of locating features of interest is substantially increased relative to existing mesh-based systems.

In an example, an image rendering application is hosted on a computing device. The image rendering application accesses a source image. Locations of features of interest are marked and tracked in metadata associated with the source image. For instance, the image rendering application is configured to run a facial recognition algorithm to recognize facial features in the source image.

Next, the image rendering application receives user input identifying a warping operation applicable to a portion of the source image. The user input can be received via a user interface of the computing device. The warping operation requests particular displacement to the portion, where the portion includes one or more features of interest. The displacement can include one or more of translational movement, rotational movement, skewing, and resizing (increasing or shrinking) of the portion.

Based on the warping operation, the image rendering application generates the destination image from the source image. In an example, the image rendering operation generates a mesh for the destination image. Such a mesh is referred to herein as a "destination mesh." A point on a mesh is referred to herein as a "mesh point" and corresponds to a pixel from an image having the mesh. The destination mesh generally has a lower resolution than the source image. In an example, the destination mesh corresponds to only the warped portion of the source image. In this example, the image rendering application generates the destination image by warping the portion from the source image and copying the remaining portion. In another example, the destination mesh corresponds to the entire destination image.

In both of the examples above, the image portion is warped according to a backward map that maps mesh points between the destination mesh and the source image. For each mesh point of the destination mesh (referred to herein as a "destination mesh point"), the backward map identifies a pixel of the source image (referred to herein as a "source pixel"). Hence, the backward mapping enables the image rendering application to acquire the necessary pixel information from the portion of the source image to perform the image warping of that portion in the destination image.

Further, the image rendering application generates a forward map. For instance, a mesh from the source image is generated, where the mesh includes a version of the source image at a lower resolution. A mesh of a source image is referred to herein as a "source mesh." For each mesh point of the source mesh (referred to herein as a "source mesh point"), the forward map identifies a pixel in the destination image (e.g., referred to herein as a "destination pixel"). Hence, the forward map enables the image rendering application to track changes (or lack of change) to locations of features of interest between the source and destination images. For instance, if a source mesh point corresponds to a feature of interest, the image rendering application identifies the corresponding destination pixel based on the forward map and marks the destination pixel as a location for the feature of interest in the destination image.

In an example, the forward map is generated based on the backward map, the destination mesh, and the source mesh. Specifically, the image rendering application changes the geometry of the destination mesh (e.g., from a tile-based geometry to a triangle-based geometry) and applies the backward map to the new geometry to also generate a new geometry for the source mesh. The new geometry is used to derive the forward map.

To illustrate, consider the example of tiles as the original geometry and triangles as the new geometry. The destination mesh may be thought of as being formed by tiles, where each tile is a square having corner points corresponding to destination mesh point. To generate the forward map, the image rendering application splits each destination tile (e.g., tile from the destination mesh) into triangles (e.g., two equilateral, right angle triangles in the case of square tiles). The backward map is applied to the triangles of the destination mesh (referred to herein as "destination triangles") to generate triangles falling in the source image (referred to herein as "source triangles"). For each pair of a destination triangle and a source triangle, the image rendering application computes a transformation from the destination triangle to the source triangle and inverts the transformation to compute an inverse transformation. Additionally, the image rendering application identifies the source mesh point(s), if any, that falls in the source triangle. The inverse transformation is applied to the identified source mesh point(s), resulting in forward vector(s). Accordingly, the image rendering application generates the forward map by applying the different inverse transformations to the different source mesh points, where the forward map includes the collection of forward vectors.

Because a forward map is used, the image rendering application more accurately tracks the location of a warped feature of interest in the destination image regardless of any displacement offset resulting from the warping. In addition, because different mesh geometries are used in the computation of the forward map (e.g., tile-based mesh and triangle-based mesh or other geometries), different types of information are considered for the analysis (e.g., one information type derived from tile-based mesh and another information type derived from the triangle-based mesh). Thus, the analysis is more diverse and robust and accounts for information about all of the source mesh points. Since each mesh point in the source image is mapped to a corresponding destination pixel in the destination image no holes exist in the forward map. Instead, all source mesh points are typically mapped forward to the destination image, thereby increasing the accuracy of tracking locations of warped features of interest. In an example, tile-based and triangle-based meshes are the least computationally complex geometries to analyze and their use ensures that no holes exist.

Figure 1:
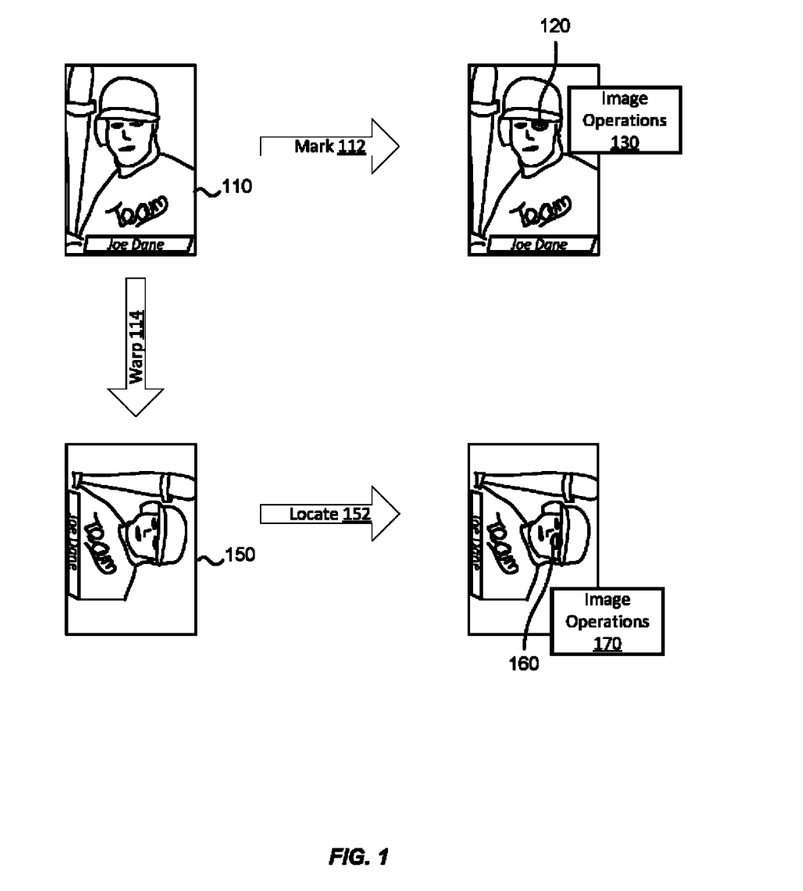
FIG. 1 illustrates an example of image rendering operations supported by an image rendering application, according to embodiments of the present disclosure.

FIG. 1 illustrates an example of image rendering operations supported by an image rendering application. The image rendering operation is hosted on a computing device. In an example, the computing device is an end-user device that displays a graphical user interface (GUI), for user input and output of a user of the end-user device. In another example, the computing device is remote from an end-user device and provides access to the image rendering operation as a network computing service (e.g., a cloud-based service).

As illustrated in FIG. 1, the image rendering application renders a source image 110 in the GUI. As used herein, a "source image" refers to an image from which other images are derived. The source image 110 shows a baseball player. Of course, other content and objects within the source image 110 are likewise possible. The image rendering application marks 112 features of interest in the source image 110. The marking includes, for instance, displaying a GUI element 120 to identify a location of a feature of interest in the source image 110 as shown in the top right corner of FIG. 1. Additionally, the image rendering application displays a control GUI 130 that facilitates image-related operations applicable to the feature of interest. These operations include, for instance, selecting, editing, deleting, changing one or more properties of the feature of interest and can depend on the feature of interest itself. For instance, if the feature is an eye, the operations include changing the eye color. In comparison, if the feature is a mouth, the operations include resizing the lips to draw a smile.

Different techniques exist for the marking. In one example, the image rendering application automatically recognizes the features of interest based on an image processing algorithm that generally rely on pixel properties. For instance, the image rendering application utilizes a facial recognition algorithm to mark the facial features (e.g., eyes, mouth, nose) of the baseball player. In another example, the feature recognition is manual. Specifically, the user selects and identifies the features of interest by providing user input via the user interface. In both examples, the image rendering application maintains a mapping of the features of interest relative to the source image 110. The mapping identifies the pixels of the source image 110 that correspond to each feature and the locations of such pixels in the source image 110. The image rendering application stores the mapping in metadata of the source image 110 and/or in local or remote storage of the computing device.

In an example, the image rendering application also enables image warping 114. For instance, the image rendering application provides a warping tool, such as a brush. The user operates the warping tool via the GUI resulting in user input that identifies parameters of the image warping 114. Examples of parameters include one or more the portions of the source image 110 that should be warped and the properties of the image warping 114 (e.g., values for the translational movement, rotational movement, resizing, or some combination thereof).

As shown in the bottom left corner of FIG. 1, the image warping 114 includes rotating the baseball player by ninety degrees and shrinking its size along the vertical axis. The image rendering application generates and renders a destination image 150 from the source image 110 according to the image warping 114. As used herein, a "destination image" refers to an image derived from a source image according to an image-related operation, such as image warping.

In addition, the image rendering application locates 152 the features of interest in the destination image 150. Some of these features may have been subject to the image warping. For instance, the eyes of the baseball player are re-oriented from a horizontal position in the source image 110 to a vertical position in the destination image 150 and are shrunk. Once a feature of interest is located, the image rendering application also displays a GUI element 160 to identify the new location of the features in the destination image 150 as shown in the bottom right corner of FIG. 1. Further, the image rendering application displays a control GUI 170 that facilitates image-related operations applicable to the feature of interest. These operations can be but need not be the same as the operations facilitated by the control GUI 130.

The image rendering application maintains a mapping of the features of interest relative to the destination image 150. The mapping identifies the pixels in the destination image 150 that correspond to each feature and the locations of such pixels. The image rendering application stores the mapping in metadata of the destination image 150, in storage local to the image rendering application, and/or in local or remote storage of the computing device. In an example, this mapping may be combined or maintained in a same file as the mapping of the source image 110. In an example, each mapping stores the absolute location of a feature of interest. In another example, one mapping (e.g., the one of the source image 110) stores the absolute location, while the other mapping (e.g., the one of the destination image 150) stores a relative shift (e.g., a change to the location of the feature in the destination image 150 relative to its absolute location in the source image 110). In this example, if there is no shift (e.g., there is no change to the absolute location), the no information location is stored in the other mapping, thereby reducing the size of the mapping and saving memory space. Instead, the image rendering application assumes that there is no shift if the location information for a feature is not available (e.g., not stored) in the mapping of the destination image 150.

As described herein, the image rendering application uses source and destination meshes and forward and backward maps to perform the image warping 114 and the feature-locating 152. Details of these components and their uses are further described in the next figures.

Figure 2:
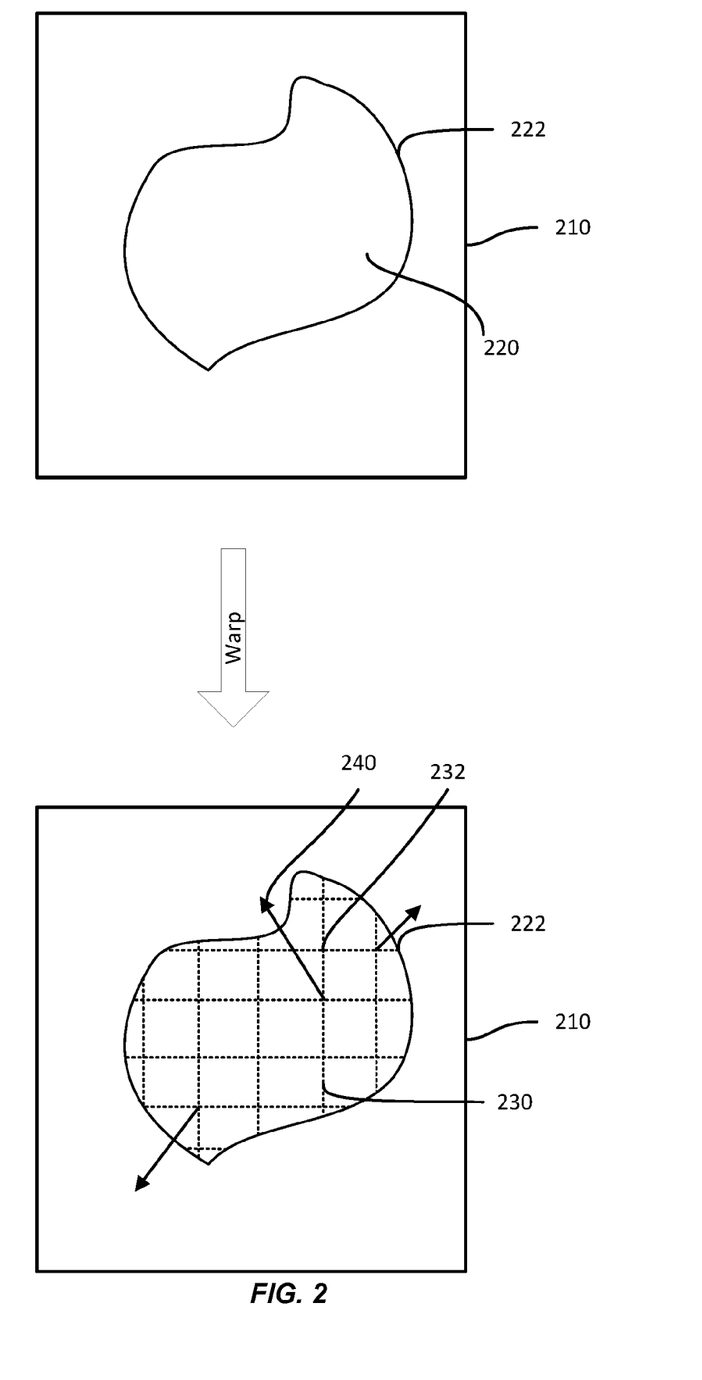
FIG. 2 illustrates an example of user input identifying an image-warping operation applicable to a portion of an image, according to embodiments of the present disclosure.

FIG. 2 illustrates an example of user input identifying an image warping operation applicable to a portion 220 of a source image 210. An image rendering application renders the source image 210 at a GUI. The user input is received via the GUI and identifies parameters of the image warping. For instance, the user input defines the image portion 220 and the properties of the image warping.

In an example, the image portion 220 is defined with a perimeter 222 that specifies a region of influence. The region of influence covers one or more pixels in the source image 210. A warping effect is applied to the covered pixels based on vectors, as further described in more detail below. The perimeter 222 has a shape and a size. A user defines the perimeter 222 using conventional user interface techniques, such as by selecting a location in the source image 210 using a pointing device, such as a mouse.

The user input specifying the shape of the perimeter 222 can include input drawing or painting the perimeter 222, modifying a previously defined shape, and/or selecting a shape from a number of predefined shapes. The shape of the perimeter 222 specified by the user can be rotationally symmetric, such as a regular polygon (e.g., a triangle, square, hexagon, octagon, rhombus or other parallelepiped) or rotationally asymmetric.

In an example, to warp the image portion 220, the image rendering application generates a source mesh 230 that spans at least the image portion 220. The properties of the source mesh (e.g., resolution) can be automatically set based on predefined settings or can be defined by the user input. The source mesh 230 includes a set of source mesh points 232. The image rendering application applies vectors 240 at some or all of the source mesh points 232 to warp the image portion 220. Each vector originates at a source mesh point. The properties of the vector are derived from the user input.

More specifically, the user can define the vectors 240 by specifying a magnitude and a direction for each vector. In an example, the user can define any arbitrary value, within predetermined constraints, for the magnitude and the direction of each vector. In another example, the user can define the vectors 240 by specifying a distribution for the magnitude and/or the direction (e.g., the user can select from predefined functions describing distributions of magnitudes/directions and optionally modify predefined parameters for the distributions). The distribution of the magnitude and/or the direction of the vectors 240 can be any arbitrary distribution, including translationally symmetric or asymmetric and/or rotationally symmetric or asymmetric distributions. As described below, the magnitude and the direction of each vector are used to determine the effect of the image warping.

Figure 3:
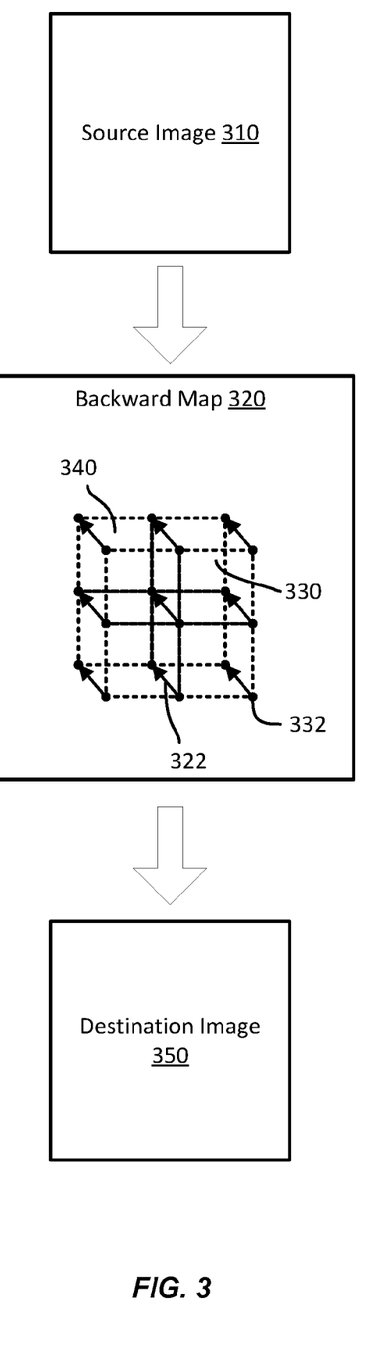
FIG. 3 illustrates an example of applying an image-warping operation based on a backward map, according to embodiments of the present disclosure.

FIG. 3 illustrates an example image warping operation applied to a source image 310 based on a backward map 320. The application results in a destination image 350. As illustrated, the backward map 320 includes a plurality of vectors 322. Each of the vectors 322 identifies a distortion (e.g., location displacement based on the magnitude and direction of the vector) applicable to an image pixel. Accordingly, the backward map 320 can be thought of as a distortion vector field.

In an example, the distortions are defined relative to a destination mesh 330 and the source image 310. The destination mesh 330 belongs to the destination image 350. Each of the vectors 322 begins at a destination mesh point 332 of the destination mesh 330 and ends at a source pixel 342 of the source image 310. Hence, the backward map 320 enables an image rendering application to determine, for each destination mesh point in the destination mesh 330, the corresponding source pixel from the source image 310 and the distortion applicable to the source point that would define the destination mesh point. Bilinear interpolation is applied to populate interior destination points within each mesh destination tile (e.g., a tile defined by destination mesh points).

More specifically, each destination mesh point is associated with a portion in the destination image 350. The destination mesh points 332 collectively form the destination mesh 330. The backward map is used to sample pixels from the source image 310 to generate the portion in the destination image 350.

In an example, the sampling includes copying pixels at particular pixel intervals (e.g., every fourth pixel in the vertical direction and every fourth pixel the horizontal direction) from the portion in the source image 310 to the portion in the destination image 350 according to the vectors 322. In another example, the sampling includes applying a predetermined weight function to the copied pixels.

In the illustrative example of FIG. 3, the vectors 322 are shown as having a same magnitude and as being directed toward the upper left. Therefore, objects in the source image 310 that are subject to the image warping (e.g., that fall in the image portion to be warped) appear to have moved toward the lower right in the destination image 350. Of course, other types of distortions (e.g., uniform or non-uniform translational and/or rotational displacement) are also possible by defining such distortions as a collection of vectors in the backward map 320.

Figure 4:
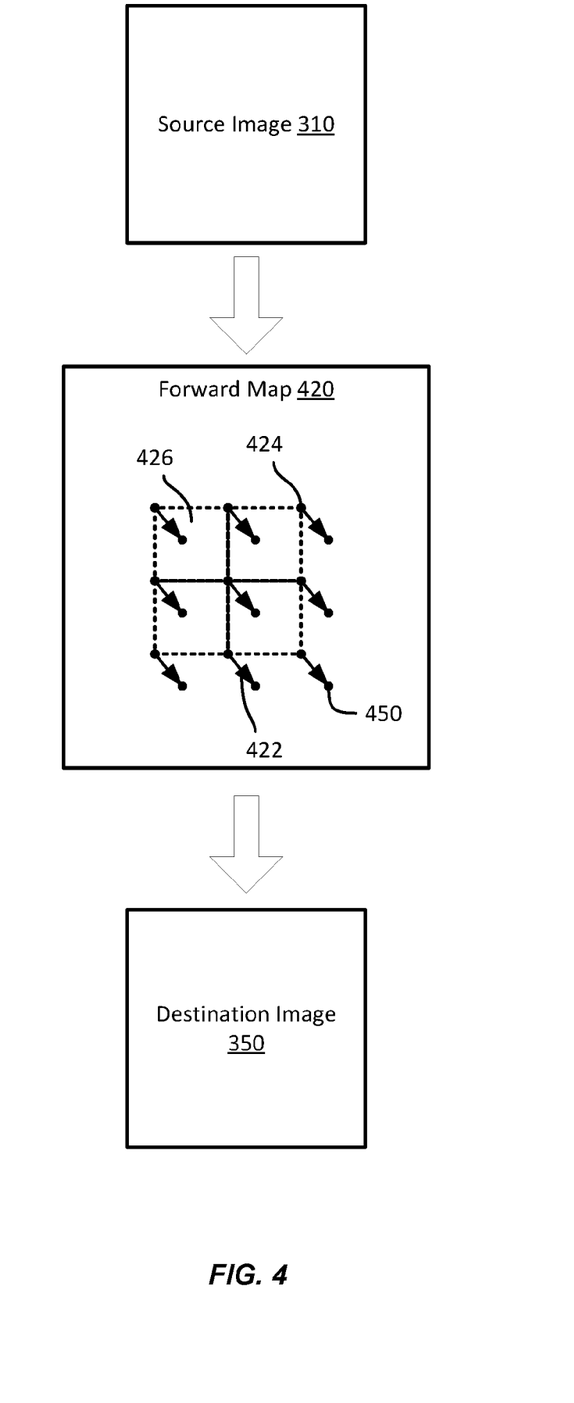
FIG. 4 illustrates an example of locating a feature based on a forward map, according to embodiments of the present disclosure.

FIG. 4 illustrates an example of locating a feature based on a forward map 420. In this example, the destination image 350 and the source image 310 of FIG. 3 are used. As illustrated, the forward map 420 includes a plurality of vectors 422. Each of the vectors 422 originates at a source mesh point 424 from a source mesh 426 and ends at a destination pixel 450 from the destination image 350. The source mesh 426 belongs to the source image 310. Each vector identifies a change to the location of a source mesh point relative to the destination image 350. In other words, the change specifies where a source point from the source mesh 426 (or, equivalently, the source pixel that corresponds to the source mesh point) is mapped to or located in the destination image 350.

Because of different factors associated with the image warping including, for example, displacement offsets, the forward map 420 is not necessarily the inverse of the backward map 320 in many instances. In other words, the forward map 420 need not map the source mesh points 424 back to the destination mesh points 332. Instead, the forward map 420 can map some or all of the source mesh points 424 to other arrangements of the destination pixels. FIG. 4 illustrates this mapping by showing the source mesh points 424 as being mapped to destination pixels 450.

The forward map 420 enables the image rendering application to determine, for each source mesh point in the source mesh 426, the corresponding destination 430 pixel in the destination image 350. Accordingly, if a source mesh point is associated with a feature of interest (e.g., is marked as belong to such a feature), the image rendering operation can also locate the feature in the destination image 350. More specifically, the image rendering operation applies the respective vector from the forward map 420 to identify the destination pixel and sets the location of the destination pixel as that of the feature of interest in the destination image 350.

In the illustrative example of FIG. 4, the vectors 422 are shown as having a same magnitude and as being directed toward the lower right. Therefore, features of interest in the source image 310 that were subject to the image warping (e.g., that fell in the warped image portion) have moved toward the lower right in the destination image 350. Of course, other types of location change are also possible and are tracked according to a collection of vectors in the forward map 420.

Figure 5:
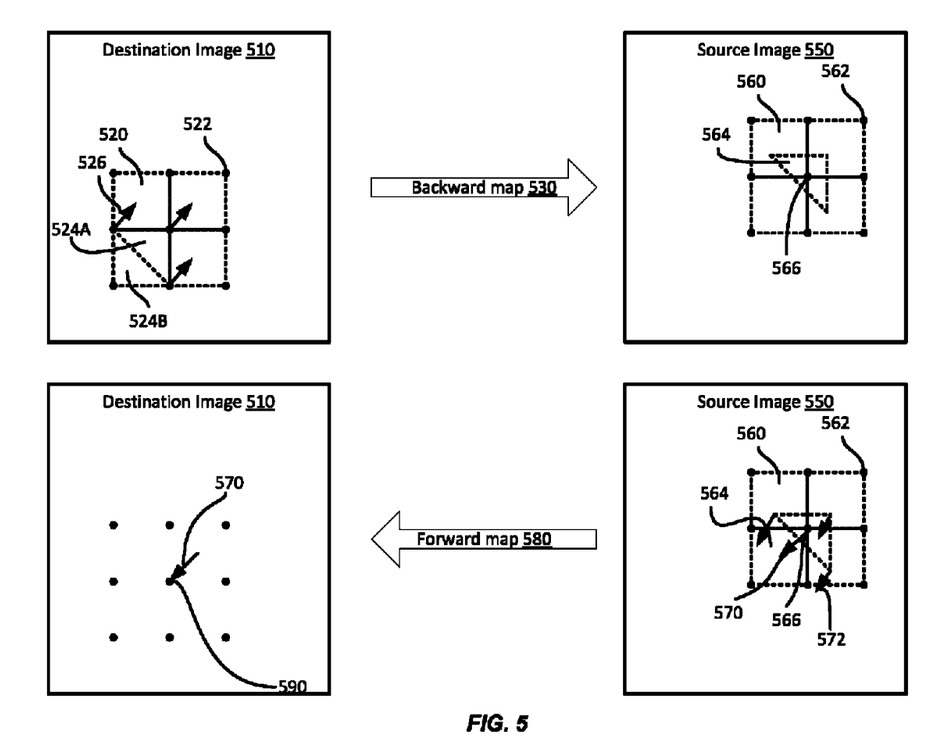
FIG. 5 illustrates an example of generating a forward map and locating a feature of interest based on the forward map, according to embodiments of the present disclosure.

FIG. 5 illustrates an example of generating a forward map and locating a feature of interest based on the forward map 580. As described herein, while one mesh geometry is used for generating a backward map 530, another mesh geometry is derived therefrom and used for generating the forward map 580. More specifically, the backward map 530 is generated from sampling a source image to generate a source mesh 560 and from magnitudes and directions of vectors defining how a destination mesh 520 is generated from distorting the source mesh 560. On the other hand, the forward map 580 is generated from the backward map 530 and geometries derived from that of the source and destination meshes 560 and 520.

As illustrated, a destination image 510 includes a warped image portion for which a destination mesh 520 exists. The destination mesh 520 includes a number of destination mesh points 522. The destination mesh points 522 define a geometry of the destination mesh 520. In an example, the geometry is a set of contiguous tiles, where the destination mesh points are the corners of the tiles. In this example, a tile can have a particular polygonal shape, such as a square.

In comparison, a source image 550 includes a portion that is subject to an image warping operation. A source mesh 560 exists for the image portion. Similarly to the destination mesh 520, the source mesh 560 includes a number of source mesh points 562 arranged in a geometry. The geometry can be the same as that of the destination mesh 520 and includes, for instance, a set of contiguous tiles (e.g., squares).

The backward map 530 maps the destination mesh points 522 to source pixels. This mapping relies on the geometries (e.g., the tile arrangements) of the destination mesh 520. In comparison, the forward map 580 relies on another geometry that can be derived from the tile arrangements.

To generate the forward map 580, each tile in the destination mesh 520 is split into a number of triangles, such as two right angle triangles 524A and 524B (or two equilateral, right angle triangles in the case of a square tile). Such triangles are referred to herein as destination triangles 524.

Accordingly, each destination triangle 524 includes three destination mesh points 522 that correspond to the three triangle corners. The backward map 530 includes vectors 526 corresponding to the three mesh points 522. The three vectors 526 are applied to the three destination mesh points 522 and transform the three mesh points 522 into three source points, resulting in a source triangle 564 in the source mesh 560. The transformation is referred to herein as a backward transformation. Because of various factors, including displacement offset and sampling resolution, the backward transformation need not be linear. Accordingly, the source triangle 564 can have any shape and its corners need not align with source pixels 562. In particular, the corners of the source triangle 564 can be floating points (e.g., decimals rather than integers). The process of applying vectors from the backward map is repeated across the various destination triangles 524 to generate source triangles 564.

Each source triangle 564 is analyzed to identify source mesh points 566, if any, that fall within the source triangle 564 (e.g., belong to the area of the source triangle 564). For each identified source mesh point 566, the backward transformation that was used to generate the respective source triangle 564 is inverted to compute a forward transformation. The forward transformation is applied to the source mesh point 566, resulting in a forward vector 570. Computing the forward transformation is shown in FIG. 5 with vectors 572 originating from the three source points of the source triangle 564 and is further described in the next figures.

Once all of the source triangles 564 are analyzed, the analysis results in forward vectors 570 at each of the source mesh points 562. The collection of forward vectors 570 defines the forward map 580. Because all of the source mesh points 562 are associated with forward vectors, no holes in the forward map 580 exist, thereby increasing the accuracy of tracking locations of warped features.

To track a location of a source mesh point in the destination image 510, the respective forward vector 570 is applied to that source mesh point and, accordingly, identifies a destination pixel 590 in the destination image 510. The location corresponds to the location of the destination pixel 590.

Figure 6:
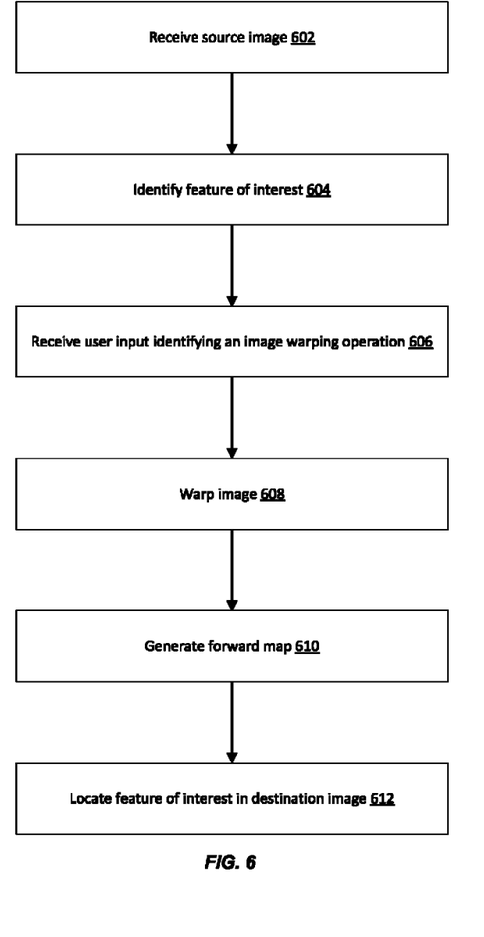
FIG. 6 is a flow chart illustrating an example of a process for warping the portion of the source image and for locating the feature of interest in the warped portion of the destination image, according to embodiments of the present disclosure.
Figure 7:
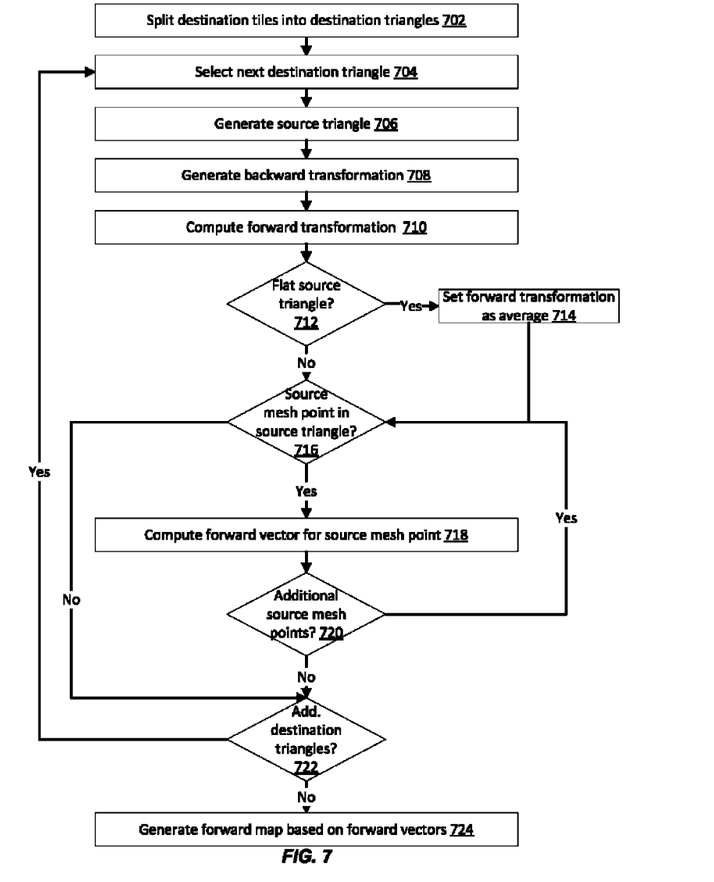
FIG. 7 is a flow chart illustrating an example of a process for generating the forward map, according to embodiments of the present disclosure.
Figure 8:
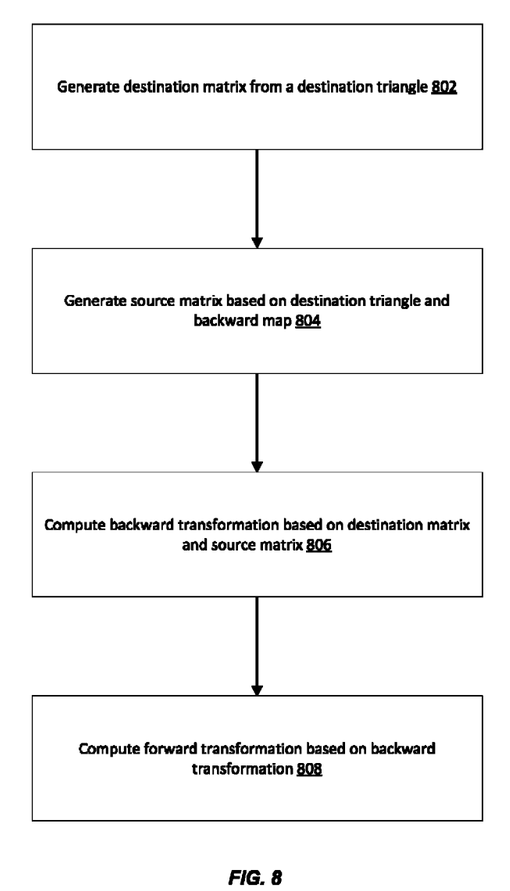
FIG. 8 is a flow chart illustrating an example of a process for computing a forward transformation for a pair of a destination triangle and a source triangle, according to embodiments of the present disclosure.

FIGS. 6-8 illustrate example flows for warping a portion of a source image and for locating a feature of interest in the warped portion of a destination images. Similar flows are applicable to warping the entire source image, applying different image warping operations over time, and/or locating multiple features of interest. An image rendering application is illustrated as performing operations of the illustrative flows. The image rendering application is hosted on a computing device that represents an end-user device or a remote system that interfaces with the end-user device.

Certain operations or steps within the operations are similar across the example flows. In the interest of clarity of explanation, such similarities are not repeated herein. In addition, while the operations are illustrated in a particular order, it should be understood that no particular order is necessary and that one or more operations may be omitted, skipped, and/or reordered.

FIG. 6 illustrates an example of a high-level flow for warping the portion of the source image and for locating the feature of interest in the warped portion of the destination image. The example flow starts at operation 602, where the image rendering application receives the source image. For example, a user operates a GUI of the image rendering application to load and render the source image from local or remote storage.

At operation 604, the image rendering application identifies the feature of interest. In an example, the feature is automatically identified based on an image processing algorithm (e.g., facial recognition algorithm to identify a facial feature). In another example, the feature is identified from user input at the GUI. In both examples, the image rendering application maintains a mapping that identifies the pixel location of the feature of interest in the source image. In yet another example, the metadata of the source image already includes the mapping and is received with the source image. Accordingly, the image rendering application identifies the feature of interest from the metadata. Once identified, the image rendering application renders a GUI element that identifies the feature of interest in the rendered source image. In addition, the image rendering application renders another GUI element, such as a control menu or window, for controllably editing one or more properties of the feature.

At operation 606, the image rendering application receives user input identifying an image warping operation. For example, the user input is received via the GUI and specifies one or more parameter for the image warping. These parameters include a perimeter of the image portion that is subject to the warping, magnitudes and directions of the warping, and/or mesh resolution.

At operation 608, the image rendering application warps the portion of the image based on the user input. For example, the image rendering application generates a source mesh for the source image (e.g., for the image portion to be warped), a destination mesh for the destination image (e.g., for the warped image portion), and a backward mapping from the destination mesh to the source image according to the parameters of the user input. The image portion is warped according to the backward map. The remaining portion of the source image, if any, is copied to the destination image.

At operation 610, the image rendering application generates a forward map. For example, the forward map is derived from the backward map, the destination mesh, and the source mesh by deriving a particular mesh geometry (e.g., triangles) from the existing mesh geometry (e.g., tiles), computing forward transformations to derive forward vectors, and setting the forward map as the collection of forward vectors.

At operation 612, the image rendering application locates the feature of interest in the destination image. For example, the image rendering application applies a particular forward vector from the forward map to a source mesh point that corresponds to the feature of interest, where the particular forward vector in turn corresponds to the source mesh point. This results in identifying a destination pixel in the destination image. The image rendering application sets the location of the feature of interest as that of the destination pixel. In addition, the image rendering application renders a GUI element that marks the location and another GUI element for controllably editing the feature of interest in the destination image. Further, the image rendering application maintains a mapping that maps the features of interest to their respective locations in the destination image.

FIG. 7 illustrates an example flow for generating the forward map. A tile-based geometry and a triangle-based geometry are illustrated. Nonetheless, other mesh geometries are possible. The example flow starts at operation 702, destination tiles are split into destination triangles. For example, the destination mesh is arranged as a set of contiguous tiles, where destination mesh points form tile corners. The image rendering application splits each of these destination tiles in two destination triangles. The number and type of destination triangles depend on the geometry of the tile. For example, a square tile is split into two equilateral, right angle triangles.

At operation 704, the image rendering application selects a next destination triangle. In an example, the rows of the destination tiles are sequentially processed. Within a row, the destination tiles are sequentially processed from left to right. Accordingly, the selection follows this intra- and inter-row processing. Other selection sequences and/or orders are also possible.

At operation 706, the image rendering application generates a source triangle from the destination triangle, resulting in a pair of destination triangle and source triangle. In an example, the corners of the destination triangle correspond to three destination mesh points. Each of the three destination mesh points is associated with a vector from the backward map. Accordingly, the image rendering application applies each of the three vectors to the associated destination mesh point. Each vector application results in a source point, which can be a floating point in the source image. The three source points define the source triangle that corresponds to the destination triangle.

At operation 708, the image rendering application generates a backward transformation. For example, the three vectors from the backward map are applied to the three corners of the destination image, resulting in the backward transformation. An example of generating the backward transformation is further illustrated in the next figure.

At operation 710, the image rendering application computes a forward transformation. In an example, the backward transformation is inverted to compute the forward transformation.

At operation 712, the image rendering application determines whether the source triangle is flat (e.g., the three corners are collinear). Different techniques exist for this determination. In one example, coordinates of the corners are analyzed to determine if they are collinear. In another example, and as further illustrated in the next figure, the backward and/or forward transformation are analyzed. If it is flat, operation 714 is performed because there is no need to compute a forward vector according to the remaining operations of the example flow. Instead, the coordinates of the three collinear corners are averaged. Any source mesh point marked at operation 708 as belonging to the flat source triangle is forward mapped to the average coordinate.

At operation 714, the image rendering application sets the forward transformation as an average of the corners of the source triangle. In this operation, because the source triangle is collinear, the forward transformation computed at operation 710 is updated to use the average of the corners instead.

At operation 716, the image rendering application determines whether any source mesh points are in the source triangle. Different techniques are available for the determination. In one example, coordinates of the source mesh points are compared to the area defined by the source triangle. If the comparison indicates that a source mesh point falls within the area, that source mesh point is identified and marked as falling within the source triangle. In another example technique, the area of the source triangle is considered. The image rendering application determines if the area can contain any point that has coordinates that are a multiple of the mesh resolution. For instance, if the mesh resolution is set to sample every fourth source pixel, if the area can include a point having a coordinate that is a multiple of four, that point is identified and marked. This illustrative technique may be more computationally efficient than the first technique because it avoids the comparison of multiple coordinates of source mesh points to the area. In yet another illustrative technique, only source mesh points that correspond to a feature of interest are considered and their coordinates are compared to the area. This technique reflects the strategy that the forward map is only needed for the features of interest and can be computationally more efficient than the first illustrative technique. Of course, a combination of these three illustrative techniques can also be implemented. If the source triangle contains any source mesh point, operation 718 is performed. Otherwise, operation 722 is performed.

At operation 718, the image rendering application computes a forward vector. For example, the forward vector is computed by applying the forward transformation to a marked source mesh point belonging to the source triangle.

At operation 720, the image rendering application determines whether an additional marked source mesh point should be considered for the analysis. If a source mesh point marked at operation 716 has not been analyzed yet, operations 718-720 are repeated. Otherwise, operation 722 is followed. Accordingly, operations 716-720 are iteratively repeated across all marked source mesh points in the source triangle.

At operation 722, the image rendering application determines whether an additional destination triangle should be considered for the analysis. If a destination triangle has not been selected yet under operation 704 and, thus, not analyzed yet, operations 704-722 are repeated. Otherwise, operation 724 is followed. Accordingly, operations 704-722 are iteratively repeated across the various destination triangles, where each iteration results in a number of forward vectors.

At operation 724, the image rendering application generates the forward map based on the forward vectors. For example, the forward map is set as a collection of the forward vectors, where each vector originates at a source mesh point and ends at a destination pixel.

FIG. 8 illustrates an example for computing a forward transformation for a pair of a destination triangle and a source triangle. As described herein in connection with FIG. 7, the forward transformation is usable to compute a forward vector, which is in turn added to the forward map.

The example flow of FIG. 8 starts at operation 802, where the image rendering application generates a destination matrix from the destination triangle of the pair. The three triangle corners correspond to three destination mesh points. Each mesh point has coordinates (e.g., x and y coordinates corresponding to the horizontal and vertical axis, respectively). The destination matrix includes the coordinates. For instance, each row of the destination matrix corresponds to coordinates of one of the destination mesh points. Hence, if x and y coordinates are used, the image rendering application sets the destination matrix as $$\begin{bmatrix} x_1 & y_1 & 1 \\ x_2 & y_2 & 1 \\ x_3 & y_3 & 1 \end{bmatrix},$$

where $x_i$ and $y_i$ are the coordinates of the destination mesh point "i" and where the (1, 1, 1) column is added to simplify the matrix computation.

At operation 804, the image rendering application generates a source matrix based on the destination matrix and the backward map. In particular, each of the three destination mesh points is associated with a vector from the backward map. The three vectors are respectively applied to the three mesh points, resulting in three source points. Each of the source points corresponds to a corner of the source triangle. The source matrix is set to include the coordinates of these source points. For instance, each row of the source matrix corresponds to coordinates of one the source points. Hence, if x and y coordinates are used, the image rendering application sets the source matrix as $$\begin{bmatrix} x'_1 & y'_1 & 1 \\ x'_2 & y'_2 & 1 \\ x'_3 & y'_3 & 1 \end{bmatrix},$$

where $x_i'$ and $y_i'$ are the coordinates of the source point "i" and where the (1, 1, 1) column is added to simplify the matrix computation.

At operation 806, the image rendering application computes a backward transformation based on the destination matrix and the source matrix. In an example, this computation is expressed as $$\begin{bmatrix} x'_1 & y'_1 & 1 \\ x'_2 & y'_2 & 1 \\ x'_3 & y'_3 & 1 \end{bmatrix} = \begin{bmatrix} x_1 & y_1 & 1 \\ x_2 & y_2 & 1 \\ x_3 & y_3 & 1 \end{bmatrix} \times BT,$$

where "BT" is the backward transformation. Accordingly, the image rendering application solves the backward transformation from this expression.

At operation 808, the image rendering application computes the forward transformation based on the backward transformation. For example, the forward transformation is computed as the inverse of the backward computation. This computation can be expressed as $FT=BT^{-1}$, where "FT" is the forward transformation. In certain situations, computing the forward transformation from the backward transformation may not be possible or desirable. These situations include, for instance, situation where the determinant of the backward transformation is zero because the source triangle is flat. In such a situation, the forward transformation is set as the average coordinates of the three destination mesh points forming the destination triangle.

Figure 9:
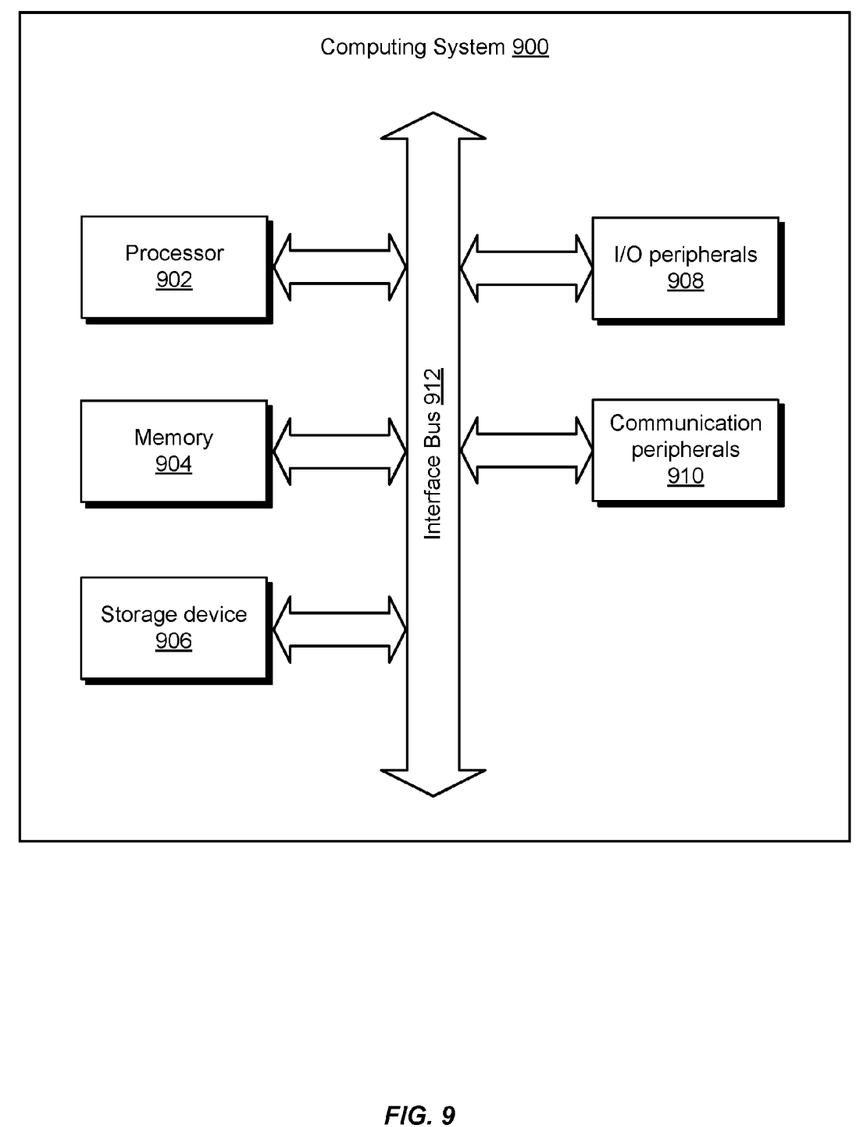
FIG. 9 illustrates an example of a computing device suitable for use in embodiments of the present disclosure.

FIG. 9 illustrates examples of components of a computing system 900. The computing system 900 is an example of a computing device that hosts the image rendering application configured according to the functionalities described in connection with FIGS. 1-8. Although these components are illustrated as belonging to a same computing system 900, the computing system 900 can be distributed.

The computing system 900 includes at least a processor 902, a memory 904, a storage device 906, input/output peripherals 908, communication peripherals 910, and an interface bus 912. The interface bus 912 is configured to communicate, transmit, and transfer data, controls, and commands among the various components of the computing system 900. The memory 904 and the storage device 906 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 904 and the storage device 906 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computing system of, for example, a cloud network or a datacenter. The input and output peripherals 908 include user interfaces such as a keyboard, screen, microphone, speaker, other input/output devices, and computing components such as graphical processing units, serial ports, parallel ports, universal serial bus, and other input/output peripherals. The input/output peripherals 908 are connected to the processor 902 through any of the ports coupled to the interface bus 912. The communication peripherals 910 are configured to facilitate communication between the computing system 900 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for efficiently and accurately locating features of interest in warped images, the computer-implemented method comprising:
   rendering, by an image rendering application hosted on a computing device, a source image and a first graphical user interface (GUI) element that identifies a feature of interest in the source image;
   accessing, by the image rendering application, a destination image, wherein the destination image is generated from the source image by warping at least a portion of the source image based on a backward map, wherein the backward map maps points from a mesh of the destination image to pixels from the source image, wherein the points of the mesh are arranged in tiles;
   generating, by the image rendering application, triangles from the tiles, wherein the triangles form a new mesh;
   generating, by the image rendering application, a forward map based on the triangles of the new mesh and the backward map, wherein the forward map maps points from a mesh of the source image to pixels from the destination image;
   identifying, by the image rendering application, a point from the mesh of the source image, wherein the point corresponds to a pixel of the source image and is associated with the feature of interest;
   locating, by the image rendering application, a pixel from the destination image based on the identified point and the forward map;
   associating, by the image rendering application, the located pixel in the destination image with the feature of interest; and
   rendering, by the image rendering application, the destination image and a second GUI element that identifies the feature of interest in the rendered destination image based on the located pixel in the destination image.

2. The computer-implemented method of claim 1, wherein the destination image is generated from the source image based on user input that identifies a warp operation for the warping applicable to the portion of the source image.

3. The computer-implemented method of claim 2, wherein the second GUI element comprises an option for controllably editing one or more properties of the feature of interest in the rendered destination image.

4. The computer-implemented method of claim 1, further comprising:
   generating, by the image rendering application, a destination matrix for each of the triangles, wherein a destination matrix corresponding to a triangle comprises locations of corners of the triangle, and wherein the forward map is generated based on destination matrices corresponding to the triangles.

5. The computer-implemented method of claim 4, further comprising:
   generating, by the image rendering application, source triangles from the triangles based on the backward map and the destination matrices; and
   generating, by the image rendering application, a source matrix for each of the source triangles, wherein a source matrix corresponding to a source triangle comprises locations of corners of the source triangle.

6. The computer-implemented method of claim 5, further comprising:
   generating, by the image rendering application, a forward transformation from each pair of a triangle and a source triangle based on corresponding destination matrix and source matrix.

7. The computer-implemented method of claim 6, further comprising:
   identifying, by the image rendering application, that a particular point from the mesh of the source image falls within an area of a source triangle, wherein the source triangle belongs to a pair of a triangle and a source triangle and is associated with a particular forward transformation; and
   generating, by the image rendering application, a forward vector based on the particular point and the particular forward transformation, wherein the forward vector identifies a point from destination image corresponding to the particular point from the mesh of the source image.

8. The computer-implemented method of claim 7, wherein the forward map comprises forward vectors generated based on forward transformations applied to points from the mesh of the source image.

9. A non-transitory computer-readable storage medium storing instructions that, when executed on a computing device, configure the computing device to perform operations comprising:
   rendering a source image and a first graphical user interface (GUI) element that identifies a feature of interest in the source image;
   generating a destination image from the source image by applying a warp operation to the source image based on a backward map, wherein the backward map maps points from a mesh of the destination image to pixels of the source image, wherein the points from the mesh are arranged in tiles;
   splitting the tiles into triangles;
   generating a forward map based on the triangles and the backward map, wherein the forward map maps points from a mesh of the source image to pixels of the destination image;
   identifying a point from the mesh of the source image, wherein the point corresponds to a pixel from the source image and is associated with the feature of interest;
   locating a pixel from the destination image based on the identified point and the forward map; and
   rendering the destination image and a second GUI element that identifies the feature of interest in the rendered destination image based on the located pixel from the destination image.

10. The non-transitory computer-readable storage medium of claim 9, wherein the point is identified from a source triangle, and wherein the operations further comprise:

generating the source triangle by at least applying the backward map to a triangle of the triangles; and determining that the point belongs to an area defined by the source triangle.

11. The non-transitory computer-readable storage medium of claim 9, wherein identifying the point comprises:

generating a source triangle by at least applying the backward map to a triangle of the triangles;

determining that the pixel of the source image belongs to an area defined by the source triangle; and setting the point as the pixel of the source image.

12. The non-transitory computer-readable storage medium of claim 9, wherein the mesh of the source image has a lower resolution than the source image, and wherein identifying the point comprises:

generating a source triangle by at least applying the backward map to a triangle of the triangles;

determining that the pixel of the source image has a coordinate that corresponds to a multiple of the lower resolution; and setting the point as the pixel of the source image.

13. The non-transitory computer-readable storage medium of claim 9, wherein generating the forward map comprises:

generating a source triangle by at least applying the backward map to a triangle of the triangles;

generating a forward transformation based on the source triangle and the triangle; and generating a forward vector by applying the forward transformation to the identified point from the mesh of the source image.

14. The non-transitory computer-readable storage medium of claim 13, wherein the operations further comprise:

determining that the source triangle is flat;

determining locations of three points from the mesh of the destination image, wherein the three points correspond to corners of the triangle; and generating an average location by averaging the locations of the three points, wherein the forward vector maps the identified point from the mesh of the source image to the average location.

15. The non-transitory computer-readable storage medium of claim 9, wherein the operations further comprise:

rendering the source image and a first graphical user interface (GUI) element that identifies a feature of interest in the source image; and rendering the destination image and a second GUI element that identifies the feature of interest in the destination image based on the located pixel in the destination image.

16. A system comprising:

a processor; and a memory communicatively coupled to the processor and storing instructions of an image rendering applications, wherein the instructions, upon execution by the processor, cause the system to perform image rendering operations comprising:

rendering a source image and a first graphical user interface (GUI) element that identifies a feature of interest in the source image;

generating a destination image from the source image by applying a warp operation to the source image based on a backward map, wherein the backward map maps points from a mesh of the destination image to pixels of the source image, wherein the points from the mesh are arranged in tiles;

splitting the tiles into triangles;

generating a forward map based on the triangles and the backward map, wherein the forward map maps points from a mesh of the source image to pixels of the destination image;

identifying a point from the mesh of the source image, wherein the point corresponds to a pixel of the source image and is associated with the feature of interest;

locating a pixel from the destination image based on the identified point and the forward map; and rendering the destination image and a second GUI element that identifies the feature of interest in the rendered destination image based on the located pixel from the destination image.

17. The system of claim 16, wherein each tile is split into two right angle triangles.

18. The system of claim 16, wherein the instructions of the image rendering operations are stored as a plug-in of the image rendering application.

19. The system of claim 16, wherein locating the pixel from the destination image comprises storing a location information about the pixel based on a shift relative to a location of the identified point from the mesh of the source image.

20. The system of claim 19, wherein the image rendering operations further comprise:

locating a second pixel from the destination image based on the forward map and a second point from the mesh of the source image;

determining that a location of the second pixel did not shift relative to a location of the second point; and selectively storing the location information about the pixel and not storing location information about the second pixel based on the pixel having a location shift and the second pixel not having a location shift.

* * * * *